(12) United States Patent
Chandra et al.

(10) Patent No.: US 10,775,972 B2
(45) Date of Patent: Sep. 15, 2020

(54) TECHNIQUES TO CONTROL NOTIFICATIONS FOR CONTENT ITEMS IN A COLLABORATION PLATFORM

(71) Applicant: Microsoft Technology Licensing, LLC, Redmond, WA (US)

(72) Inventors: Omeed Chandra, Seattle, WA (US); Ginger Elizabeth Fang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 15/089,162

(22) Filed: Apr. 1, 2016

(65) Prior Publication Data
US 2017/0285896 A1   Oct. 5, 2017

(51) Int. Cl.
| G06F 3/0484 | (2013.01) |
| G06Q 10/06 | (2012.01) |
| G06F 40/30 | (2020.01) |
| G06F 3/14 | (2006.01) |
| H04L 29/06 | (2006.01) |

(52) U.S. Cl.
CPC .......... *G06F 3/0484* (2013.01); *G06F 3/1454* (2013.01); *G06F 40/30* (2020.01); *G06Q 10/06* (2013.01); *H04L 65/4015* (2013.01)

(58) Field of Classification Search
CPC .. G06F 3/0484; G06F 3/1454; G06F 17/2785; G06F 40/30; H04L 65/4015
See application file for complete search history.

(56) References Cited

U.S. PATENT DOCUMENTS

| 8,380,743 B2* | 2/2013 | Convertino .......... G06Q 10/107 707/780 |
| 8,725,771 B2* | 5/2014 | Crochet .............. G06F 17/2211 707/790 |
| 9,247,021 B1* | 1/2016 | Obbard ................. H04L 67/306 |
| 2012/0143917 A1* | 6/2012 | Prabaker .......... G06F 17/30165 707/784 |
| 2012/0143964 A1 | 6/2012 | Deluca et al. |

(Continued)

OTHER PUBLICATIONS

International Search Report and Written Opinion received for PCT Patent Application No. PCT/US2017/024641, dated May 30, 2017, 13 pages.

(Continued)

*Primary Examiner* — William L Bashore
*Assistant Examiner* — Gregory A Distefano
(74) *Attorney, Agent, or Firm* — Talern IP Law, LLP

(57) ABSTRACT

Techniques to control notifications for a collaboration platform. Content items being stored in the collaboration platform are shared amongst devices coupled to the collaboration platform. To determine whether to subscribe to notifications corresponding to a content item, a notification component of the collaboration platform examines the content item for characteristics of an indirect relationship between the shared content item and a user of a device of the devices. If the indirect relationship exists and warrants a subscription to the notifications, the notification component stores subscription data for the content item and in response to an occurrence of a subscribed activity, the notification component communicates a notification message to the user's device. Other embodiments are described and claimed.

13 Claims, 11 Drawing Sheets

(56) References Cited

U.S. PATENT DOCUMENTS

| | | | | |
|---|---|---|---|---|
| 2013/0218862 A1* | 8/2013 | Ghosh | ................... | G06F 16/248 |
| | | | | 707/706 |
| 2013/0238706 A1* | 9/2013 | Desai | ................... | H04L 67/306 |
| | | | | 709/204 |
| 2013/0275429 A1* | 10/2013 | York | ................ | G06Q 50/01 |
| | | | | 707/737 |
| 2013/0297581 A1* | 11/2013 | Ghosh | ................... | G06F 16/313 |
| | | | | 707/706 |
| 2014/0122595 A1* | 5/2014 | Murdoch | ............. | C03C 21/002 |
| | | | | 709/204 |
| 2015/0350259 A1* | 12/2015 | Garg | .................... | G06F 16/958 |
| | | | | 709/203 |
| 2017/0177728 A1* | 6/2017 | Yu | ......................... | G06Q 10/10 |

OTHER PUBLICATIONS

Chavanu, Bakari, "How to Share Notebooks in Evernote & Springpad", <http://www.makeuseof.com/tag/author/bchavanu>, Feb. 2, 2013, 6 pages.

Taylor, Bret, "Quip 1.5: Import documents (and a bunch more)", <https://quip.com/blog/import-documents>, Nov. 21, 2013, 7 pages.

\* cited by examiner

Interface 400

| File | Edit | Review | View | Apps |
|------|------|--------|------|------|

| Section A | Section B | Section C | Section D | Section E | Section F | Section G | Section H | Section I |

As relationships go, my commitment to technology was initially questionable. Put off by intimidating instructions and time consuming tools, I had avoided trying new software as if it carried the plague. Forever taxing books between school and home, the boot of my car resembled an overfilled and unreliable office with books and paper everywhere. Microsoft's OneNote was the digital organiser I needed to get the volumes of work I received every day in order.

OneNote was initially recommended to me by a colleague who pledged, "it's all I need to survive my week", describing how it saved him time and improved his teaching practice. I was doubtful. Despite my apprehension, he assured me that it would be quick and easy to set up and so I stepped out of my comfort zone and dived into the realm of digital learning. Swallowing my pride and learning never to doubt a science teacher again, I found myself instantly settled in the OneNote environment. Navigating myself through my notebook, I created a variety of pages to organise my every need, from shopping lists to A2 annotations of exam specifications it was all there. Only when I began questioning what else I could do using OneNote did my colleague point me towards the tool's interactive guides which can be found here: http://onenoteineducation.com/

404

Alert — New Notification

Notification Pane 500

Notification Message List

| Date - Time | Filename | User Identity | Activity |
|---|---|---|---|
| 1/2/2016 – 01:00 | File_One | User1 | Edit |
| 1/2/2016 – 02:00 | File_Two | User1 | Update |
| 1/2/2016 – 04:00 | File_One | User2 | Multiple Edits; Comment |

⊞ EDIT_1
   EDIT_2 to Page 1, Section B, Paragraph 3
⊞ The notification pane is a portion of user interface that provides a temporary source for notification messages. It can also be used to display information corresponding to activities performed on a content item. The notification pane has been known historically as the system tray or status area but can also be implemented as a dialog box.
   Comment to Page 1, Section B, Paragraph 3
⊞ "Notifications can be displayed using any of a number of GUI elements"

| 1/2/2016 – 05:00 | File_Two | User3 | View |
| 1/2/2016 – 06:00 | File_Three | User1 | Comment |

502

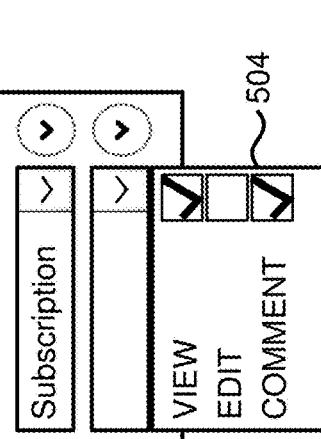

504
VIEW
EDIT
COMMENT

PROCESS A CONTENT ITEM SHARED AMONGST A PLURALITY OF DEVICES
702

IDENTIFY AN INDIRECT RELATIONSHIP BETWEEN THE SHARED CONTENT ITEM AND A USER OF A DEVICE OF THE PLURALITY OF DEVICES
704

STORE A SUBSCRIPTION STATUS FOR THE SHARED CONTENT ITEM BASED UPON THE USER BEHAVIOR INDICIA, THE SUBSCRIPTION STATUS CORRESPONDING TO COMMUNICATING A NOTIFICATION OF AN ACTIVITY CORRESPONDING TO THE SHARED CONTENT ITEM
706

```
┌─────────────────────────────────────────────┐
│  EXAMINING A SHARED CONTENT ITEM FOR A      │
│         COLLABORATION PROJECT               │
│                   802                       │
└─────────────────────────────────────────────┘
                      │
┌─────────────────────────────────────────────┐
│ COMPARING THE OTHER CONTENT ITEMS TO THE    │
│  SHARED CONTENT ITEM (TO DETERMINE          │
│             SIMILARITY)                     │
│                   804                       │
└─────────────────────────────────────────────┘
                      │
┌─────────────────────────────────────────────┐
│ IDENTIFYING USER BEHAVIOR INDICIA           │
│  ASSOCIATED WITH OTHER CONTENT ITEMS        │
│                   806                       │
└─────────────────────────────────────────────┘
                      │
┌─────────────────────────────────────────────┐
│ IDENTIFYING A RELATIONSHIP BETWEEN A USER   │
│  AND AN AUTHOR OF THE SHARED CONTENT ITEM   │
│                   808                       │
└─────────────────────────────────────────────┘
```

*FIG. 8*

TECHNIQUES TO CONTROL NOTIFICATIONS FOR CONTENT ITEMS IN A COLLABORATION PLATFORM

BACKGROUND

A collaboration platform generally refers to technology configured to connect employees with the people, information, and resources they require at any given time. There is considerable difficulty in gauging a user's interest in a particular content item in comparison to other content items. When users are collaborating on a project involving a substantial number of different content items (e.g., documents or portions of documents), these users manually indicate which content items are of interest. Enterprise collaboration technology, without direct input from a user, cannot identify content items that are likely to be of interest, especially when the user is unaware that these content items exist.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to control notifications for content items in a collaboration platform. Some embodiments are particularly directed to techniques to control notifications for content items by establishing automatic subscriptions such that some users are provided these notifications based upon an indirect relationship to the content items. In one embodiment, for example, an apparatus may comprise a logic circuit and logic operative on the logic circuit to process a content item being shared amongst a plurality of devices, identify an indirect relationship between the shared content item and a user of a device of the plurality of devices, and store subscription data for the shared content item based upon the indirect relationship, the subscription data corresponding to communicating a notification message to the device in response to an activity corresponding to the shared content item. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of an interface for the system of FIG. 1.

FIG. 5 illustrates an embodiment of a notification pane for displaying notification messages from the collaboration platform of FIG. 1.

FIG. 7 illustrates an embodiment of a logic flow for the system of FIG. 1.

FIG. 8 illustrates an embodiment of a logic flow for a notification component of the collaboration platform of FIG. 1.

DETAILED DESCRIPTION

Figure 1:
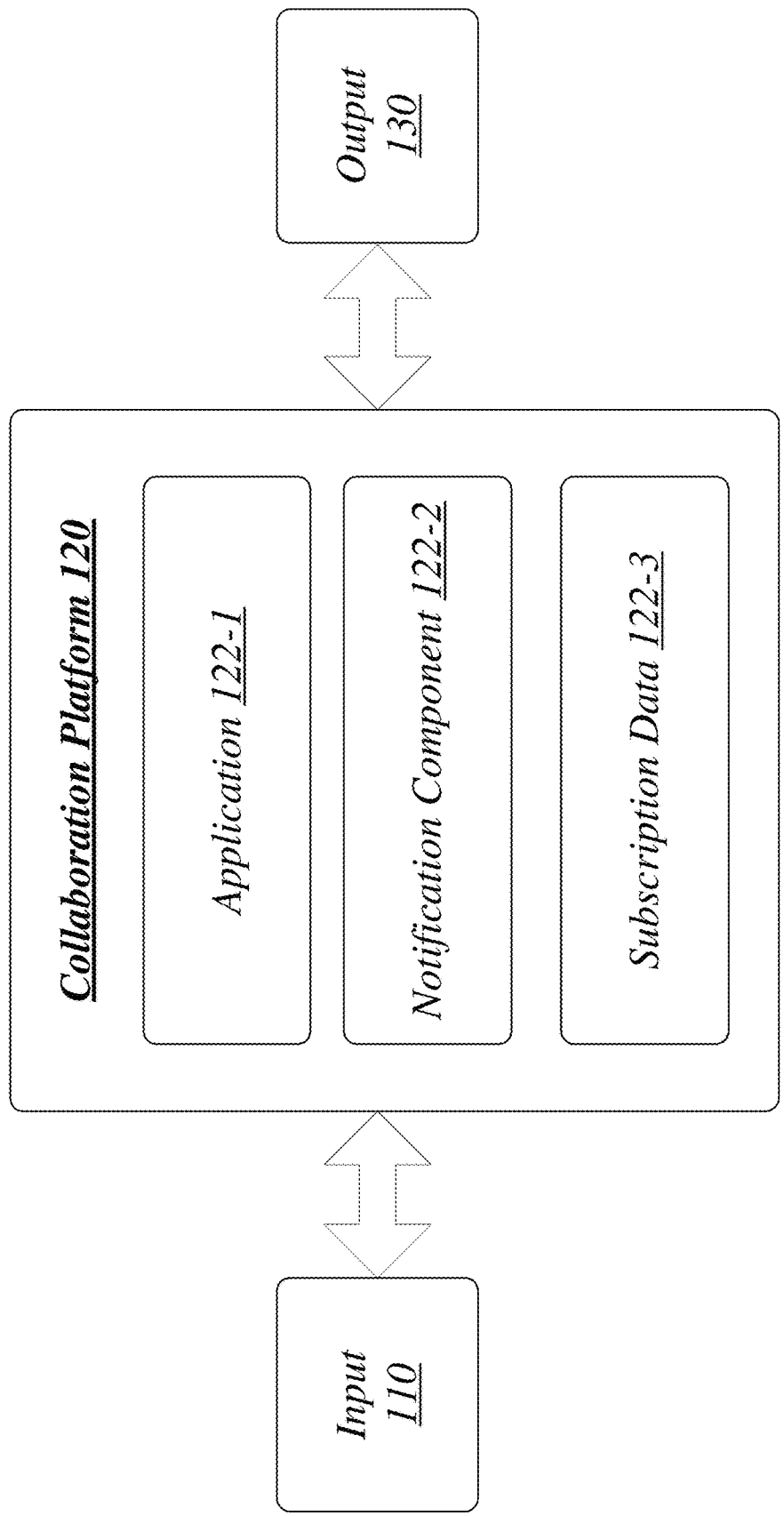
FIG. 1 illustrates an embodiment of a system to control notifications for content items in a collaboration platform.

Various embodiments are directed to techniques for controlling notifications in a collaboration platform. Because some users of the collaboration platform are likely to be more interested in some content items than in other content items, it is desirable for the collaboration platform to intelligently subscribe users to content items of interest to those users. The techniques described in the present disclosure may accomplish this intelligent subscription by determining which users are more likely to be interested in a particular content item. Conventional technology is limited to relying upon user input specifically subscribe to notifications in the particular content item.

In some embodiments, the techniques described in the present disclosure identify characteristics of an indirect relationship between the user and the particular content item that is sufficient to warrant an automatic subscription to notification messages. It is appreciated that a technique may weigh some of these characteristics differently than other characteristics. Based on one or more of these characteristics, the techniques provide a determination as to whether the user is likely to be interested in receiving notifications of changes made to the particular content item. If a sufficient indirect relationship exists, the techniques automatically subscribe the user to notifications for that content.

These techniques may fine-grain the subscription to specific portions of the particular content item such that the user is not subscribed to notifications corresponding to any remaining portion. To illustrate by way of example, when using a MICROSOFT® OneNote® notebook for a group collaboration project, a user might be interested in receiving notifications for changes made to sections and pages pertaining to that user's assigned areas of the project. Simultaneously, the user may not want to be bothered by notifications for sections and pages that aren't relevant to those assigned areas of the project.

As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components. Although the system 100 shown in FIG. 1 has a limited number of elements in a certain topology, it may be appreciated that the system 100 may include more or less elements in alternate topologies as desired for a given implementation.

The system 100 may comprise logic, implemented at least in part in hardware and executed by circuitry, for controlling a collaboration platform 120. One example implementation includes an enterprise collaboration platform generally configured with tools and processes to ensure users (e.g., employees) can connect and collaborate with the people, information and the resources they require at any given time. Collaboration platforms typically include an email client, Internet conferencing, social media sharing, video capabilities, document sharing capabilities, instant messaging and more. Enterprise collaboration platforms are designed to be installed on-premises or deployed via the Internet as cloud-based services in a cloud computing environment.

The collaboration platform 120 may comprise, as an example component, an application 122-1. The application 122-1 may be comprised of processing circuit-executable instructions generally arranged to provide support for a plurality of content items being shared amongst a plurality of users. This support may be in the form of providing application services to electronic devices under the control of the plurality of users. In some embodiments, the electronic devices may be thin-clients configured to display a rendered interface to the application 122-1.

The collaboration platform 120 may comprise, as another example component, a notification component 122-2 that includes logic operative on a logic circuit to process a content item being shared amongst a plurality of devices, identify an indirect relationship between the shared content item and a user of a device of the plurality of devices, and store subscription data 122-3 for the shared content item based upon the indirect relationship, the subscription data 122-3 corresponding to communicating a notification message to the device in response to an activity corresponding to the shared content item.

In one embodiment, the notification component 122-2 may be generally arranged to automatically subscribe (and, if needed, unsubscribe) a user to notifications corresponding to activities related to any given shared content item. As an example, the notification component 122-2 may be operative to generate and communicate notification messages to the user's device under certain circumstances, such as when a content item is edited, created, updated, commented on, and/or the like. It is appreciated that the notification component 122-2 can be configured to recognize any activity type of interest and the present disclosure does not limit the scope of activities that trigger the generation and communication of the above-mentioned notification messages.

The notification component 122-2 of the collaboration platform 120 may employ various techniques to determine whether a user is likely to be interested in receiving notification messages corresponding to changes made to specific shared content items (e.g. files, folders, notebooks, sections, or pages).

Some example techniques measure semantic similarity between a shared content item and a document representing the user's work. One example implementation of the notification component 122-2 computes a value or a set of values denoting the semantic similarity between the shared content item and the document. If that value or the set of values exceed a threshold, the notification component 122-2 may assume that the user desires notification messages corresponding to any changes made to the shared content item.

Other example techniques include statistical learning techniques where the notification component 122-2 identifies a content item of interest based upon the user's behavior. Some example behavioral indicators measure the user's responses to notification messages. Other example indicators measure an indirect relationship between a shared content item and a user/a group of users. In one example embodiment, the notification component 122-2 may identify an indirect relationship given a number of user mentions in the content item itself. Another example embodiment may determine that an indirect relationship exists based on a number of references to the user's own work by the original author(s). It is appreciated that the notification component 122-2 can be configured to identify variations of indirect relationships between a user and a content item.

To illustrate by way of example, if a particular content item includes an electronic link (e.g., a hyperlink) that when activated, retrieves one of the user's authored documents, there likely exists an indirect relationship between the user and the particular document. This indirect relationship also strongly indicates that the user would be interested in the particular content item. It is appreciated that present disclosure is not limited to electronic links; other forms of indirect relationships are envisioned including instances when the particular content items includes the user's email address or other contact information.

Upon identifying a suitable indirect relationship, whenever the particular content item is edited by another user, the notification component 122-2 generates and communicates to the user's device a message to operate as a notification of the other user's edition. According to one embodiment, the notification component 122-2 determines a subscription status for the particular content item, thereby linking the user's device(s) to notification messages of any edits made to the particular content item. Some example implementations may set the subscription status to specify which type(s) of edits should warrant communication of a notification message. For instance, the notification component 122-2 may be operative to send to the user's device(s) a notification message only when the other user enters multiple edits.

It is important to note that the present disclosure is not limiting to communicating notification messages to the user's device(s) when those notifications inform the user of edits made to the particular content item; the notification component 122-2 may store a subscription status directing notification messages to the user's device(s) in response to updates of and/or comments inserted into the particular content item. Furthermore, the notification component 122-2 may be operative to send to the user's device(s) a notification message only when the particular content item is updated to a new version.

The collaboration platform 120 may comprise data storage technology to store subscription data 122-3 for the content items being collaborated on by multiple users through the application 122-1. According to one example implementation of the collaboration platform 120, the subscription data 122-3 includes a subscription status for an activity related to a shared content item. As described herein, the subscription status may describe one of various activities directed towards the shared content item, including editing portions of the shared content item, updating the shared content item to a new version, commenting on a portion of the shared content item, and/or the like.

Figure 2:
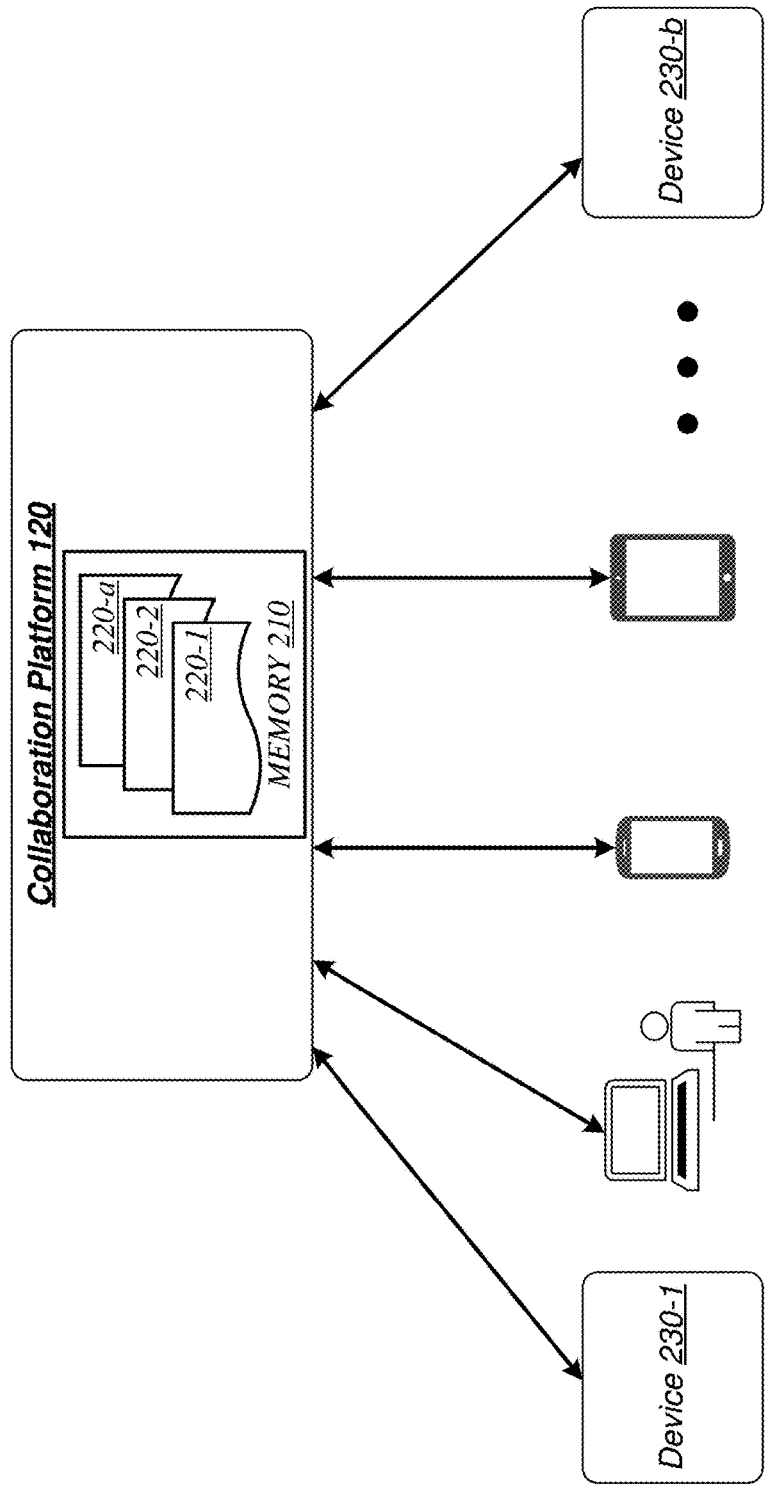
FIG. 2 illustrates an embodiment of an operational environment for the system of FIG. 1.

FIG. 2 illustrates an embodiment of an operational environment 200 for the system 100. The operational environment 200 may include a centralized system implementing some or all of the structure and/or operations for the system 100 in a single computing entity, such as the collaboration platform 120. It is appreciated that a single computing device or a plurality of computing devices in cooperation together may be configured as the collaboration platform 120.

As shown in FIG. 2, the collaboration platform 120 employs data storage technology including memory 210. It is appreciated that in some example embodiments the collaboration platform 120 partitions the memory 210 into individually allocable memory units. These memory units may be metered, such as when implemented in a cloud computing environment.

The memory 210 generally stores a variety of content items 220 of which some or all are shared amongst a plurality of users running a plurality of devices 230. It is worthy to note that "a" and "b" and "c" and similar designators as used herein are intended to be variables representing any positive integer. Thus, for example, if an implementation sets a value for b=5, then a complete set of devices 230-$b$ may include devices 230-1, 230-2, 230-3, 230-4 and 230-5. The embodiments are not limited in this context. The devices 230-$b$ may communicate with other devices and/or with the collaboration platform 120 over a communications media using communications signals via a communications component (not illustrated). The other devices may be internal or external to the operational environment 200 as desired for a given implementation.

In some embodiments, the content items 220 may be combined in some manner to form a collaboration project. Some example projects involve software programs, documents, spreadsheets, and/or the like, and any combination of these content items. When a user of a device 230-1, for instance, makes a change to a shared content item of the content items 220, the notification component 122-2 of the collaboration platform 120 generates a notification message to be communicated to one or more of the other device 230-$b$. As described herein, in order to determine which of these devices 230-$b$ is to be subscribed to such notification messages, the notification component 122-2 accesses a subscription status for the shared content item that is based upon an indirect relationship between a device user and the shared content item.

Figure 3:
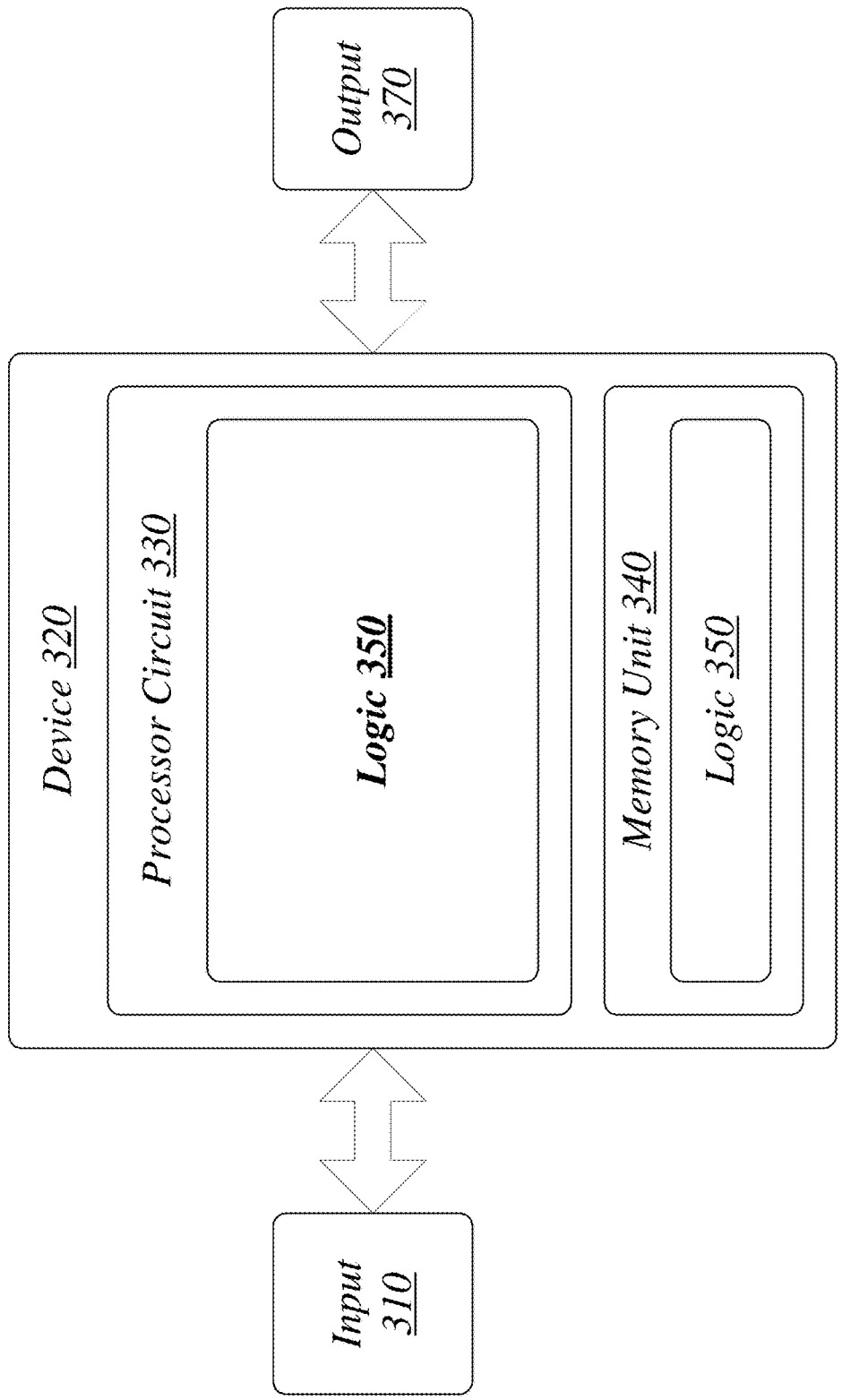
FIG. 3 illustrates an embodiment of an operational environment for a device coupled to the collaboration platform of FIG. 1.

FIG. 3 illustrates an embodiment of an operational environment 300 for a device. As shown in FIG. 3, input 310 is received by a device 320 comprising a processing circuit 330 and at least one memory unit 340.

The device 320 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 320 may execute processing operations or logic for the system 100 using a processing component. The processing component may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 320 may execute communications operations or logic for the system 100 using a communications component. The communications component may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Some example implementations of the device 320 may configure the logic 350 with presentation logic for the application 122-1 of the collaboration platform 120. The presentation logic may execute scripted code to generate an interface to view content items associated with the application 122-1. The presentation logic, for instance, may display user interface controls that facilitate changes to the content items, such as the insertion or deletion of text.

The presentation logic in the logic 350 also generates user interface controls for displaying notification messages in an embodiment referred to as a notification pane. As described herein, when the notification component 122-2 of the collaboration platform 120 automatically subscribes the device 320 to a particular content item, the notification component 122-2 communicates such notification messages when the particular content item is changed. Some of these user interface controls enable the user to modify the automatic subscription.

FIG. 4 illustrates an embodiment of an interface 400 for the system 100. As shown in FIG. 4, the interface 400 generally refers to an arrangement of operating system and/or graphical user interface (GUI) elements that facilitate at least some user interaction with a project 402. As described herein, application logic (e.g., the application 122-1 of FIG. 1) may instruct presentation logic (e.g., the logic 350 of FIG. 3) running on a device to render some of these elements.

The presentation logic, for example, may execute script code to generate a content pane 404 to display a portion of a shared content item 404 for the project 402. The shared content item may be organized according to sections and, within each section, one or more content pages. The presentation logic may generate a GUI element 406 (e.g., a frame component) to present a view of multiple pages in a given section (e.g., "Section 1"). In response to a selection of a page in the GUI element 406, content for that page is rendered and displayed in the content pane 404. The presentation logic may execute additional script code to generate a GUI element 408 having a tab sub-elements of which each tab sub-element corresponds to a separate section of the shared content item 402. Activation of any tab sub-element via user selection (e.g., by touch, gesture, pointing device, and/or the like) prompts the presentation logic to render and display in the content pane 404 content associated with that sub-element's section.

The presentation logic and/or other program logic may generate a menu bar element 410 of different function groups and a given menu bar sub-element (e.g., a drop-down dialog box) provides access to a certain function group. FIG. 4 depicts the Interface 400 as having a FILE function group, an EDIT function group, a REVIEW function group, a VIEW function group, and an APPS function group. The FILE function group, for instance, includes file-related functions directed towards opening a project, starting a new project, and/or the like. It is appreciated that other function groups are envisioned to be within the scope of the present disclosure and the interface 400 depicted in FIG. 4 is not limited to the illustrated function groups in FIG. 4.

As depicted in FIG. 4, a GUI element 412 may be configured to display an alert of an incoming notification message or, alternatively, to display at least a portion of the incoming notification message itself. The incoming notification message may or may not be related to the content item being displayed in the content pane 404. The incoming notification message, for instance, may correspond to a content item authored by the colleague mentioned in the first sentence of the second paragraph displayed in the content pane 404. In one embodiment, the notifications component 122-2 may automatically subscribe the user to receiving notification messages when the colleague creates a content item or when a change is made to one of the colleague's content items. If the content pane 404 includes a link to the colleague's email address, the notification component 122-2 may identify the colleague's content items by examining authorship data for those content items.

As another example, the incoming notification message may correspond to a change made to interactive guides mentioned in the last sentence of the second paragraph in the content pane 404. Because a reference in the form a hyperlink to the interaction guide's source website "http://onenoteineducation.com/" is included in the content pane 404, it can be assumed that the user desires notifications of activities corresponding to the interactive guides. According to one embodiment, the notification component 122-2 stores subscription data to subscribe the user to edits, comments, and/or updates corresponding to those interactive guides. The notification component 122-2 may generate and communicate the incoming notification message in response to an update to the interaction guide's source website.

FIG. 5 illustrates an embodiment of a notification pane 500 for displaying notification messages generated by the notifications component 122-2 of the system 100. As shown in FIG. 5, the notification pane 500 combines GUI elements into a notification message list to effectively delineate notification messages that have been communicated to an electronic device (e.g., the device 320 of FIG. 3) from the notifications component 122-2.

As further illustrated in FIG. 5, each notification message describes certain attributes related to an activity made to a shared content item. Example attributes of a notification message include, but are not limited to, date/time information, a filename, a user identity, activity information, a subscription status, and/or the like. The notification pane includes a user interface control operative to collapse a notification message to show additional information. As depicted in FIG. 5, for example, when a control 502 is activated, logic in the electronic device renders additional GUI elements to display additional information below a notification message corresponding to content item File_One at time "04:00" on date "1/2/2016". As further depicted in FIG. 5, some of the additional GUI elements may be expanded to show even more information describing a specific edit or comment on the content item File_One.

The subscription status may be altered at any time by using a GUI element commonly known as a drop-down dialog. As an example, FIG. 5 depicts such a GUI element as a drop-down dialog 504. The subscription status also can be removed if the user desire not to receive any more notification messages for a particular shared content item. This may be accomplished by unchecking each available checkbox in the GUI element.

For example, if no more notification messages for content item File_Three are desired, the user may cancel the automatic subscription by unchecking each selected checkbox in the drop-down dialog 504. When the user unchecks the VIEW checkbox and the COMMENT checkbox in the drop-down dialog 504, logic in the user's device may communicate a control directive instructing the notifications component 122-2 to remove a subscription for the content item File_Three. It is appreciated that the above-mentioned logic may instruct one or more operating system components to communicate the control directive as a response to the notification message. The notification component 122-2, in turn, may modify the subscription data 122-3 to cancel the subscription.

As another example, if the user desires to be notified when File_Three is updated (e.g., to a new version) but does not want to be notified of views or of comments to a current version, the user may use the drop-down dialog 504 to change the automatic subscription. This may be accomplished by unchecking the VIEW checkbox and/or the COMMENT checkbox in the drop-down dialog 504 and then, checking the EDIT checkbox in the drop-down dialog 504. The logic running in the user's device may communicate a control directive instructing the notifications component 122-2 to change a subscription for the content item File_Three. The notification component 122-2, in turn, may modify the subscription data 122-3 to change the subscription to generate notification messages only when File_Three is updated to a new version.

According to an alternative implementation of the embodiment depicted in FIG. 5, the drop-down dialog 504 allows the user to specify which portion(s) of the content item are to be associated with notification messages. If the user responds to the automatic subscription to content item File_Three by selecting a specific page or section of that content item, the notification component 122-2 may modify the subscription data 122-3 such that a notification message is generated and communicated only when that specific page or section is edited. The user's selection effectively excludes other pages or sections from the subscription to the content item File_Three.

Figure 6:
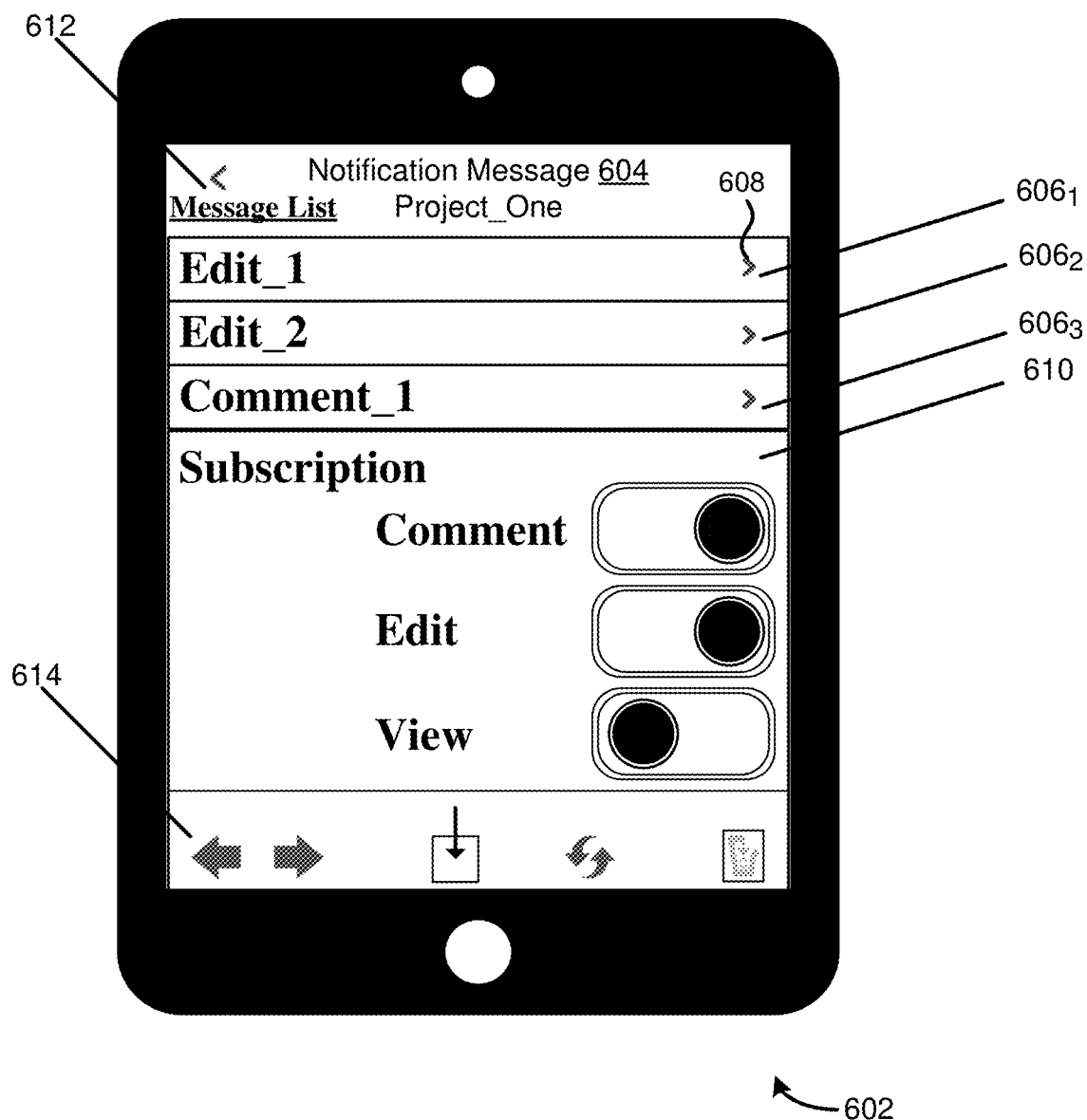
FIG. 6 illustrates an embodiment of a message page for presenting a notification message from the collaboration platform of FIG. 1.

FIG. 6 illustrates an embodiment of a message page 600 for displaying a notification message from the collaboration platform 120 of FIG. 1. The message page 600 is illustrated as being displayed on a screen of a mobile computing device 602, such as a mobile phone or tablet device. The mobile computing device 602 may include one of the devices 230 of FIG. 2 or the device 320 of FIG. 3. It is appreciated that the message page 600 is not limited to a particular implementation and can be displayed on a display mechanism for any computing environment, including a display mechanism in a laptop or desktop computing device.

As described herein, the notification component 122-2 of the collaboration platform 120 generates the notification message 604 for communication to the mobile computing device 602. In turn, the mobile computing device 602 process the notification message 604 for presentation on the message page 600. In the message page 600, the mobile computing device 602 presents on the screen the notification message 604 for a content item labelled "Project_One" and an interface for the notification message 604 with a number of graphical user interface (GUI) elements. Operators of the mobile computing device 602 utilize these GUI elements to accomplish various tasks, such as navigating to and from the message page 600, viewing additional information about change(s) described in the notification message 604, and modifying a subscription status for the content item Project_One.

The interface on the message page 600 also includes a UI element $606_1$, a UI element $606_2$, and a UI element $606_3$ to display information for a first edit EDIT_1, a second edit EDIT_2, and a comment COMMENT_1. It is appreciated that the present disclosure envisions the usage of alternative UI elements in the message page 600. As an example, the mobile computing device 602 may generate segmented control elements to navigate to different views where each view includes information for a different change described in the notification message 604. The segmented control element may be presented as a linear set of elements of which each element functions as a button operative to display a view to a different change.

For instance, FIG. 6 depicts the UI element $606_1$ as a table with cells as sub-elements of which one cell is a text sub-element to display the text "EDIT_1" for the change EDIT_1. Another cell in the UI element $606_1$ displays a control 608 configured to expand a current view of the notification message 604. This control is a UI control being depicted in FIG. 6 with a symbol > and may be referred to as an "Expansion Indicator" according to some implementations (e.g., APPLE® iPhone® Operating System (iOS™)). When executing this expansion, the mobile computing device 602 modifies the message page 600 in order to, for example, provide more options for EDIT_1 and/or display additional information about EDIT_1. In one example implementation, tactile or gesture based activation of the control 608 (e.g., by touching the control 608) causes additional information about EDIT_1 to be displayed below the UI element $606_1$. Hence, by interacting with the control element in the UI element $606_1$, a user may navigate up and down a hierarchy of information arranged for the notification message 604.

FIG. 6 depicts another GUI element, UI element 610 operative to display information about a current subscription status for the project Project_One. As described in the present disclosure, the subscription status referred to herein may be an automatic subscription that caused the generation and communication of the notification message 602. FIG. 6 depicts the UI element 610 operating on the message page 600 as comprising UI sub-elements (e.g., toggle-switches) for each notification type associated with the subscription. For instance, FIG. 6 depicts a separate toggle-switch for each notification type. When a user activates a toggle-switch, the mobile computing device 602 turns on or off future EDIT notifications, VIEW notifications, or COMMENT notifications. It is appreciated that a different UI element may be employed in the message page 600 instead of the toggle-switch to modify the subscription.

The interface presented in the message page 600 may include other GUI elements on the screen operative to control the mobile computing device 602. In one embodiment, FIG. 6 depicts a UI element 612 at a top portion of the screen and a separate UI element 614 at a bottom portion of the screen. The UI element 612 may include a bar element (e.g., a navigation bar) that when activated, results navigation through an information hierarchy. For instance, the UI element 612 may include a control that directs the message page 600 to a different view, namely back to a view of a message list. The UI element 614 may include a bar element (e.g., a toolbar) comprising controls operative to perform actions related to the notification message 600.

As depicted in FIG. 6, the UI element 614 includes, in appearance from left to right, separate directional button operative to navigate to previous notification messages and next notification messages, a button operative to download content for the project Project_One, a button operative to refresh the notification message 600 with a more recent incoming notification message, and a button operative to delete the notification message 600 and/or remove content from the message page 600.

It is appreciated that the present disclosure envisions the usage of alternative UI elements in the message page 600. For instance, a page control may be used instead of directional buttons to navigate to the previous notification messages or next notification messages. As another alternative, the interface for the message page 600 may employ gesture-based controls through which the user may gesture (e.g., a swipe gesturer) in a particular direction (e.g., a left direction) to navigate to the previous notification messages or gesture in an opposite direction to navigate to the next notification messages.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 commences at block 702 where the logic flow 700 processes a content item shared amongst a plurality of devices. For example, the logic flow 700 may examine the shared content item as one of a plurality of content items being stored in a computing environment, such as the collaboration platform 120.

It is appreciated that there are other content items being stored in the collaboration platform 120 and those content items may be in a same collaboration project as the processed content item or, alternatively, in a completely different project. It is appreciated that the other content items may or may not bear a relationship to the user, for example the user may have authored or may have been subscribed to some of the other content items, while the user is not subscribed to receiving notifications corresponding to the processed content item.

The logic flow 700 may identify an indirect relationship to the shared content item at block 704. As one example, the logic flow 700 identifies the indirect relationship based upon the user's assigned tasks. If the shared content item relates, in some way, to a task currently being performed, notifications corresponding to the shared content item would most likely benefit the user. The logic flow 700 establishes an automatic subscription to such notifications because the user would have desired one if that user were aware of the shared content item's existence.

As another example, the logic flow 700 identifies the indirect relationship based upon a specific portion of the shared content item, such as text containing a reference to the user his/herself and/or the user's work. This reference may include the user's contact information and/or be in the form of an electronic link that when activated, opens a communication application for contacting the user via the user's device. As an alternative or in addition, this reference may include an electronic link (e.g., a hyperlink) directed to content authored by the user. Because the text includes such a reference, the logic flow 700 may assume that the shared content item may be of interest to the user and, therefore, that user may be interested in notifications describing activities (e.g., edits, comments, and/or the like) corresponding to the shared content item. For at least this reason, upon detection of the reference in the shared content item, the logic flow 700 may subscribe the user to the above-mentioned notifications by establishing a subscription status directing the above-mentioned notifications to the user's device(s).

The logic flow 700 may store a subscription status for the shared content item based upon user behavior indicia associated with other content items, the subscription status corresponding to communicating a notification of an activity corresponding to the shared content item at block 706. The subscription status may specify which activities are to cause the generation and communication of notifications to the user's device(s). For example, the logic flow 700 may subscribe the user to receiving notifications of only edits, only comments, or both edits and comments. Instead of receiving notification messages in a notification pane (e.g., as illustrated in FIG. 5), the logic flow 700 may prescribe an alternate communication mode (e.g., email, text message, and/or the like) other than placing the notification messages in the notification pane. The embodiments are not limited to this example.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may examine a content item at block 802. The examined content item may be shared amongst a plurality of electronic devices that are under direct control of a plurality of users of the collaboration platform 120 of FIG. 1. For example, the logic flow 800 may examine the content item as one of a plurality of content items being stored in the collaboration platform. Some of the content items being stored in the collaboration platform may be in a same collaboration project while other content items are in completely different projects. It is appreciated that while the other content items may or may not bear a relationship to the user—for example, the user may have authored or may have been subscribed to some of the other content items—the user is not subscribed to notifications corresponding to the examined content item.

The logic flow 800 may compare the examined content item to the other content items at block 804. For example, the logic flow 800 may compare the examined content item with another content item to determine similarities in terms of subject matter. In one embodiment, the logic flow 800 executed by the notification component 122-2 may employ a known content similarity metric configured to determine whether two or more content items describe a same topic and if so, whether the content items provide the same position or arguments. Given that the user would most likely be involved in accessing content items covering a topic of interest to that user, the logic flow 800 may subscribe the user's device components to notifications corresponding to the examined content item.

The logic flow 800 may identify user behavior indicia associated with one or more of the other content items at block 806. For example, the logic flow 800 may determine that the user previously viewed and subscribed to one example content item and given that prior relationship, there is at least some indirect relationship to the examined content item. The indirect relationship may modulate in terms of quality based upon the similarities between the examined content items. Thus, the more similarities between the examined content item and the example content item, the stronger the indirect relationship to the examined content item. Alternatively, the user may have authored, edited, updated, or commented on at least a portion of the example content item; and each of these constitutes a potential user behavior indicator for determining whether to automatically subscribe the user's device components to receiving notification messages regarding activities to the examined content item.

The logic flow 800 may identify a relationship between the user and an author or authors of the shared content item at block 804. For example, the user and the author(s) may be colleagues and/or belong to a same group (e.g., a software development group, a management group, and/or the like). In some instances, the user and the author(s) may have a previous working relationship and the user would desire to receive notification messages regarding the author(s) latest work in the form of the shared content item. By way of illustration, this previous working relationship can be reflected in the co-authorship of an older publication. Because the user is unaware of the content item's existence or has not subscribed to the latest publication, the logic flow 800 being executed by the notification component 122-2 may automatically set a subscription status for the content item where notification messages related to activities corresponding to the content item are communicated to the user's device. An interface running on the user's device may organize and display these notification messages in an interface element (e.g., a GUI element such as the notification pane 500 illustrated in FIG. 5). FIG. 4 depicts an exemplary embodiment of such an interface, but this depiction is for illustrative purposes only. The embodiments are not limited to this example.

Figure 9:
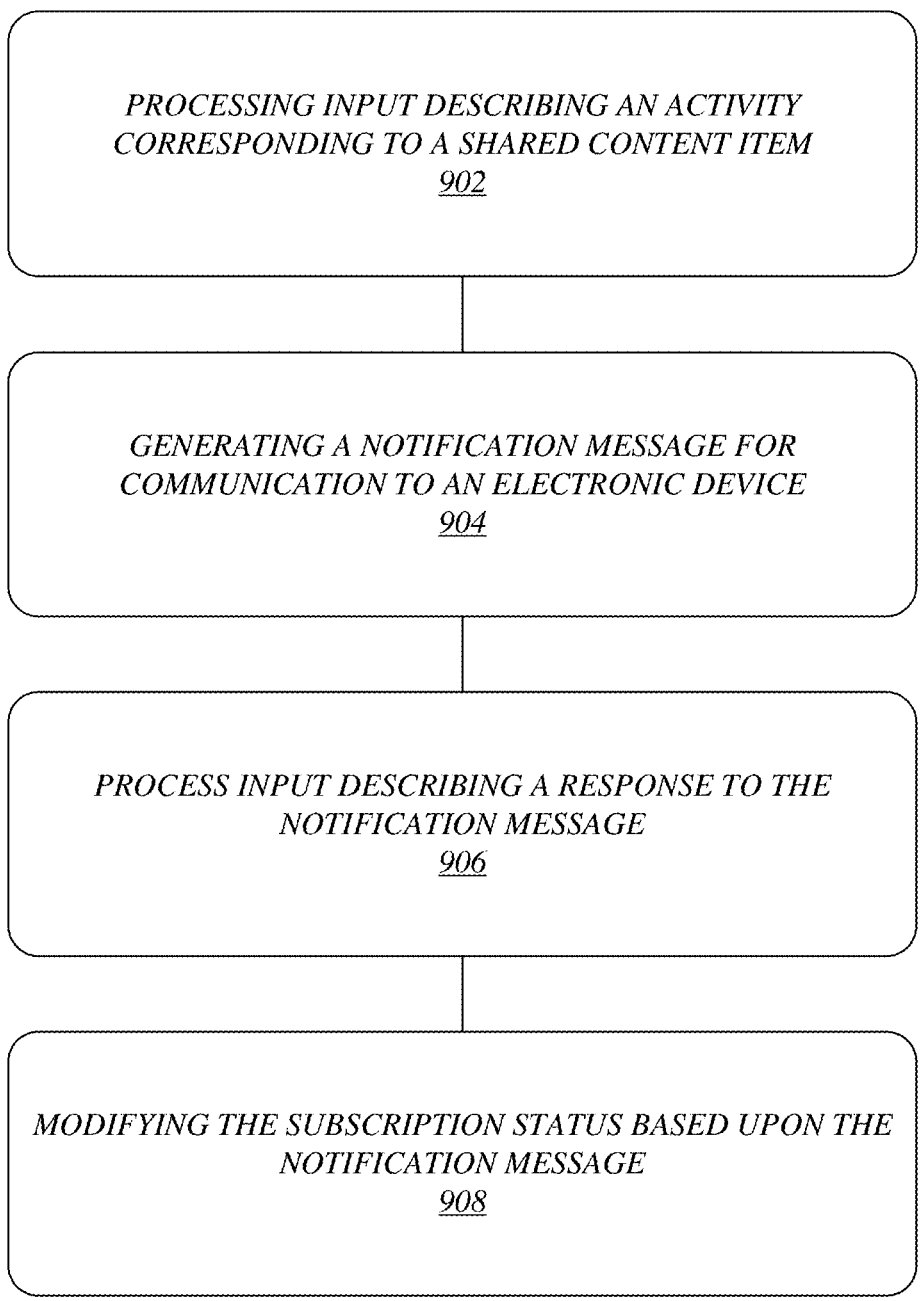
FIG. 9 illustrates an embodiment of a logic flow for the collaboration platform of FIG. 1.

FIG. 9 illustrates one embodiment of a logic flow 900. The logic flow 900 may be representative of some or all of the operations executed by one or more embodiments described herein.

In the illustrated embodiment shown in FIG. 9, the logic flow 900 processes input comprising information that describes an activity, such as a change to a shared content item at block 902. For example, the notification component 122-2, implementing the logic flow 900 in the collaboration platform 120, may receive the input from the application 122-1 when the change to the shared content item is detected. Based upon an examination of the subscription data 122-3, the logic flow 900 determines which users, if any, are to be notified of the change and which electronic devices are to receive notification messages.

Once those devices are identified, the logic flow 900 may generate a notification message for communication to each electronic device at block 904. For example, the logic flow 900 may communicate the notification message to a mobile device where the notification message is displayed in an interface element (e.g., the notification message list in the notification pane 500 of FIG. 5).

The logic flow 900 may process input comprising information that describes a response to the notification message at block 906. For example, the response may indicate a subscription cancellation at the request of a subscribed user. The logic flow 900 modifies the subscription status at block 908 to remove the subscription. The user will no longer see displayed on their device's interface notification messages corresponding to the content item. As another example, the response may indicate a subscription modification where the user no longer desires to be notified of comments entered by other users and would only like to receive notifications of edits or updates to the content item. The embodiments are not limited to this example.

Figure 10:
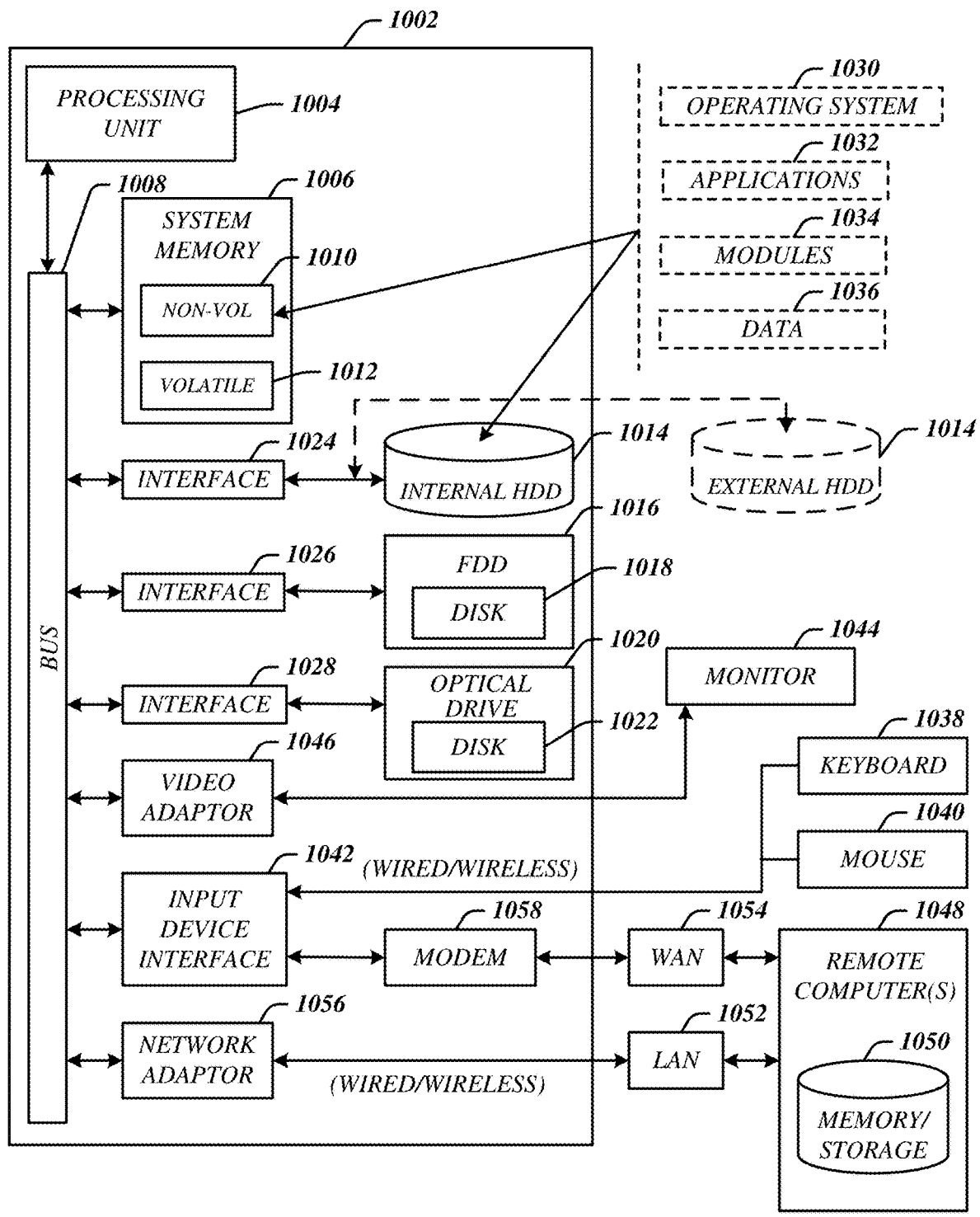
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device, such as the device 320 of FIG. 3. Examples of an electronic device may include those described with reference to FIG. 2, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 13104 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 13104 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
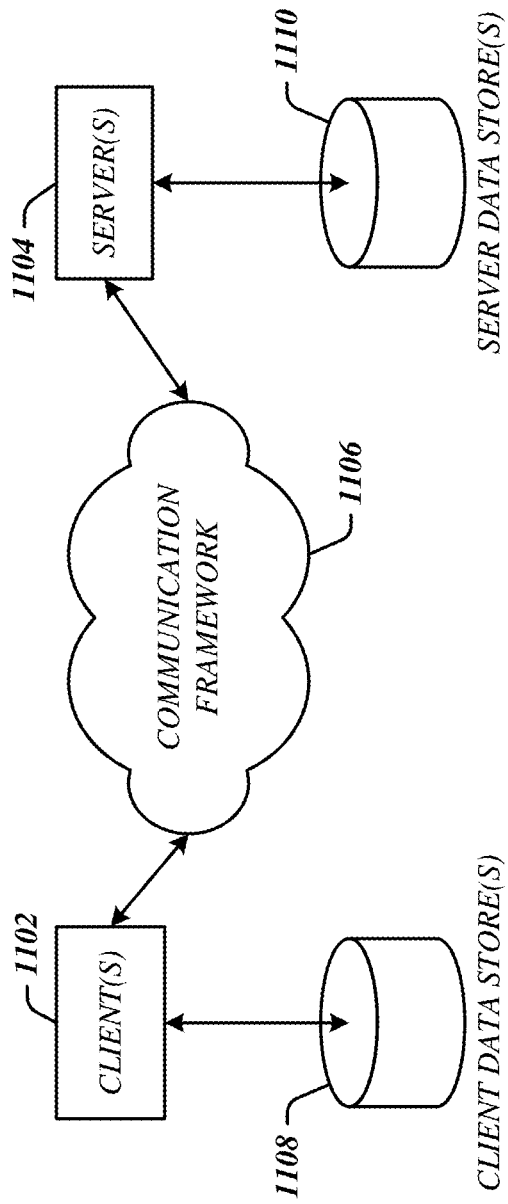
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 911. The servers 1104 may implement the collaboration platform 120. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some exemplary embodiments include an apparatus comprising a logic circuit and logic operative on the logic circuit to identify an indirect relationship between a content item and a user of a device, and store subscription data for the shared content item based upon the indirect relationship, the subscription data corresponding to communicating a notification message to the device in response to an activity corresponding to the shared content item.

The apparatus described in the preceding paragraph may further comprise logic operative to process a content item being shared amongst a plurality of devices. The apparatus described in the preceding paragraph may further comprise logic operative to identify user behavior indicia associated with other content items. The apparatus described in the preceding paragraph may further comprise logic operative to communicate to the device a notification corresponding to a change to the content item. The apparatus described in the preceding paragraph may further comprise logic operative to modify the subscription data to remove or change a subscription to the content item. The apparatus described in the preceding paragraph may further comprise logic operative to identify a relationship between the user and an author of the content item. The apparatus described in the preceding paragraph may further comprise logic operative to compare the content item to another content item according to a semantic similarity metric.

Some exemplary embodiments include a computer-implemented method, comprising processing a content item being shared amongst a plurality of devices, identifying an indirect relationship between the shared content item and a user of a device of the plurality of devices, and storing subscription data for the shared content item based upon the indirect relationship, the subscription data corresponding to communicating a notification message to the device in response to an activity corresponding to the shared content item.

The computer-implemented method described in the preceding paragraph may further comprise identifying user behavior indicia associated with other content items. The computer-implemented method described in the preceding paragraph may further comprise communicating to the device a notification corresponding to a change to the content item. The computer-implemented method described in the preceding paragraph may further comprise modifying the subscription data to remove or change a subscription to the content item. The computer-implemented method described in the preceding paragraph may further comprise identifying a relationship between the user and an author of the content item. The computer-implemented method described in the preceding paragraph may further comprise comparing the content item to another content item according to a semantic similarity metric. The computer-implemented method described in the preceding paragraph may further comprise modifying the subscription data in response to input communicated from the device.

Some exemplary embodiments include an article of manufacture comprising at least one computer-readable storage medium comprising instructions that, when executed, cause a system to process a content item being shared amongst a plurality of devices, identify an indirect relationship between the shared content item and a user of a device of the plurality of devices, and store subscription data for the shared content item based upon the indirect relationship, the subscription data corresponding to communicating a notification message to the device in response to an activity corresponding to the shared content item.

The article of manufacture described in the preceding paragraph may further comprise instructions to identify user behavior indicia associated with other content items. The article of manufacture described in the preceding paragraph may further comprise instructions to communicate to the device a notification corresponding to a change to the content item. The article of manufacture described in the preceding paragraph may further comprise instructions to modify the subscription data to remove or change a subscription to the content item. The article of manufacture described in the preceding paragraph may further comprise instructions to identify a relationship between the user and an author of the content item. The article of manufacture described in the preceding paragraph may further comprise instructions to compare the content item to another content item according to a semantic similarity metric.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system, comprising:
   a processor;
   one or more computer readable storage media; and
   program instructions to manage subscriptions to content on the one or more computer readable storage media that when executed by the processor, direct the processor to:
   identify a first set of users that are associated with a content item but do not have a subscription to the content item;
   determine, from the first set of users, a subset of users that have an indirect relationship with the content item according to one or more characteristics of the indirect relationship, wherein a characteristic of the one or more characteristics of the indirect relationship with the content item comprises:
   at least two references, in the content item, to a user; or
   at least two references, in the content item, to content authored by the user;
   automatically assign a subscription to the content item to users belonging to the subset of users that have the indirect relationship with the content item;
   store the subscription to the content item for the users belonging to the subset of users that have the indirect relationship with the content item in a subscription storage; and
   in response to an activity corresponding to the content item:
   identify subscriber users that have the subscription to the content item from the subscription storage; and
   communicate a notification message to the subscriber users, wherein the subscriber users comprise the users belonging to the subset of users that have the indirect relationship.

2. The system of claim 1, wherein the instructions further direct the processor to process the content item being shared amongst a plurality of devices.

3. The system of claim 1, wherein the instructions to determine the subset of users that have the indirect relationship with the content item include instructions that direct the processor to identify user behavior indicia associated with other content items.

4. The system of claim 1, wherein the instructions further direct the processor to remove or change the subscription to the content item.

5. A method comprising:
- identifying a first set of users that are associated with a content item but do not have a subscription to the content item;
- determining, from the first set of users, a subset of users that have an indirect relationship with the content item according to one or more characteristics of the indirect relationship; wherein a characteristic of the one or more characteristics of the indirect relationship with the content item comprises:
  - at least two references, in the content item, to a user; or
  - at least two references, in the content item, to content authored by the user;
- automatically assigning a subscription to the content item to users belonging to the subset of users that have the indirect relationship with the content item;
- storing the subscription to the content item for the users belonging to the subset of users that have the indirect relationship with the content item in a subscription storage; and
- in response to an activity corresponding to the content item,
  - identifying subscriber users that have the subscription to the content item from the subscription storage; and
  - communicating a notification message to the subscriber users, wherein the subscriber users comprise the users belonging to the subset of users that have the indirect relationship.

6. The method of claim 5, further comprising processing the content item being shared amongst a plurality of devices.

7. The method of claim 5, wherein determining the subset of users that have the indirect relationship with the content item comprises identifying user behavior indicia associated with other content items.

8. The method of claim 5, further comprising removing or changing the subscription to the content item.

9. The method of claim 5, further comprising modifying the subscription in response to input communicated from a device.

10. One or more non-transitory computer readable storage media having program instructions for managing subscriptions to content stored thereon that, when executed by a system, direct the system to:
- identify a first set of users that are associated with a content item but do not have a subscription to the content item;
- determine, from the first set of users, a subset of users that have an indirect relationship with the content item according to one or more characteristics of the indirect relationship, wherein a characteristic of the one or more characteristics of the indirect relationship with the content item comprises:
  - at least two references, in the content item, to a user; or
  - at least two references, in the content item, to content authored by the user; or
- automatically assign a subscription to the content item to users belonging to the subset of users that have the indirect relationship with the content item;
- store the subscription to the content item for the users belonging to the subset of users that have the indirect relationship with the content item in a subscription storage; and
- in response to an activity corresponding to the content item,
  - identify subscriber users that have the subscription to the content item from the subscription storage; and
  - communicate a notification message to the subscriber users, wherein the subscriber users comprise the users belonging to the subset of users that have the indirect relationship.

11. The media of claim 10, further comprising instructions that direct the system to process the content item being shared amongst a plurality of devices.

12. The media of claim 10, wherein the instructions to determine the subset of users that have the indirect relationship with the content item include instructions that direct the system to identify user behavior indicia associated with other content items.

13. The media of claim 10, further comprising instructions that direct the system to remove or change the subscription to the content item.

* * * * *